(12) United States Patent
Dumm

(10) Patent No.: US 6,276,264 B1
(45) Date of Patent: Aug. 21, 2001

(54) PORTABLE BATCH PASTEURIZER

(75) Inventor: Richard Henry Dumm, Windsor, CO (US)

(73) Assignee: Dairy Tech INC, Windsor, CO (US)

(*) Notice: Subject to any disclaimer, the term of this patent is extended or adjusted under 35 U.S.C. 154(b) by 0 days.

(21) Appl. No.: 09/696,385

(22) Filed: Oct. 24, 2000

Related U.S. Application Data

(60) Provisional application No. 60/161,041, filed on Oct. 25, 1999.

(51) Int. Cl.[7] ............... A23L 1/00; A23C 3/00; A01J 11/00
(52) U.S. Cl. ............... 99/455; 99/452; 99/470; 99/517; 99/468; 99/486; 165/61; 165/66; 426/521; 426/522
(58) Field of Search ............... 99/352–356, 359, 99/360, 467, 470, 472, 468, 452–455, 516, 517, 484, 485, 483, 486; 62/268; 165/65, 66, 103, 61, 48.1; 366/136, 144, 290, 349, 159, 176; 422/26, 300–303, 307, 295, 297; 426/520–522, 524, 523, 509–511, 407, 412

(56) References Cited

U.S. PATENT DOCUMENTS

| | | |
|---|---|---|
| 2,082,460 | 6/1937 | Omsted . |
| 2,436,585 * | 2/1948 | Mangold ............... 99/455 X |
| 2,607,566 * | 8/1952 | Saunders ............... 99/470 X |
| 2,740,558 * | 4/1956 | Steele ............... 99/452 X |
| 2,764,880 * | 10/1956 | Wenzelberger ............... 62/268 X |
| 3,369,596 * | 2/1968 | Maeland ............... 99/452 X |
| 3,618,587 * | 11/1971 | Lee, Sr. ............... 99/348 X |
| 3,638,917 * | 2/1972 | Osten ............... 366/149 X |
| 3,780,644 | 12/1973 | Canfield . |
| 3,973,048 | 8/1976 | Sollerud . |
| 4,310,476 | 1/1982 | Nahra . |
| 4,416,194 * | 11/1983 | Kemp ............... 99/453 X |
| 4,432,276 | 2/1984 | Catelli . |
| 4,446,778 | 5/1984 | Cipelletti . |
| 4,446,781 | 5/1984 | Schmitt . |
| 4,515,823 | 5/1985 | Kirschenmann . |
| 4,534,986 | 8/1985 | Hasting . |
| 4,542,268 * | 9/1985 | Jarvis et al. ............... 426/521 X |
| 4,681,458 * | 7/1987 | Cavalli ............... 366/149 X |
| 4,738,302 | 4/1988 | Abma . |
| 4,739,699 | 4/1988 | Nelson . |
| 4,813,787 * | 3/1989 | Conn ............... 99/455 X |
| 5,080,164 | 1/1992 | Hermans . |
| 5,209,157 | 5/1993 | Rodriguez . |
| 5,280,748 | 1/1994 | Pardo . |
| 5,360,055 | 11/1994 | Hup . |
| 5,424,087 | 6/1995 | Kuo . |
| 5,443,857 | 8/1995 | Arph . |
| 5,562,024 * | 10/1996 | Polny, Jr. ............... 99/483 X |
| 5,630,360 * | 5/1997 | Polny, Jr. ............... 99/358 X |

\* cited by examiner

*Primary Examiner*—Timothy F. Simone
(74) *Attorney, Agent, or Firm*—James K. Poole

(57) ABSTRACT

A portable batch pasteurizer for pasteurization or other heat treatment of contained fluids for consumption by animals or humans provides a heat transfer coil through which hot or cold fluids are pumped to heat or cool the fluid in which it is immersed. An impeller circulates the fluid in which the fluid is contained to ensure even heating or cooling.

20 Claims, 11 Drawing Sheets

PORTABLE BATCH PASTEURIZER

REFERENCE TO RELATED APPLICATION

This application claims priority from Applicant's provisional application, U.S. Ser. No. 60/161,041, for BATCH PASTEURIZER FOR FLUIDS NOT FOR HUMAN CONSUMPTION, filed Oct. 25, 1999, which application is incorporated herein by reference in its entirety.

BACKGROUND OF THE INVENTION

1. Field of the Invention

The present invention relates to apparatus for pasteurizing or heat treating fluid products for consumption by animals or humans.

2. Description of the Relevant Art

Since the dawn of history, various methods and apparatus have been devised for the heat treatment of foodstuffs for human and animal consumption, including cooking, pasteurization and sterilization. Both pasteurization and sterilization have been used with milk and related products. U.S. Pat. No. 4,310,476 provides in columns 1 to 5 an extensive discussion of pasteurization and sterilization of milk, which is incorporated herein by reference. Column 30 of the same patent identifies legal U.S. standards for milk pasteurization, which are also incorporated by reference.

Dairy farmers and other producers of foodstuffs such as milk are often required to transport their produce to central plants for processing including pasteurization or sterilization and packaging. In less advanced countries, modern processing plants may be unavailable or inaccessible, so that dairy products must be utilized locally, with whatever processing is available. Excess milk may be used on the farm for feeding calves or other livestock, but may spoil or transmit disease if not pasteurized. There is an apparent need for portable, economical apparatus for pasteurizing such milk on site to permit its safe use for feeding calves and the like. There is also a need for portable, simple and economical apparatus for processing milk at or near the source in less advanced countries for both human and animal consumption.

Numerous patents disclose methods and apparatus for sterilizing food enclosed in containers. For example, U.S. Pat. No. 5,424,087 discloses methods of sterilizing canned food in a sterilizing kettle, using hot water for preheating and steam for sterilization.

U.S. Pat. No. 4,739,699 discloses apparatus for pasteurizing or sterilizing edible foodstuffs in containers.

U.S. Pat. No. 2,082,460 discloses apparatus for sterilizing and subsequently cooling food in closed containers, using a form of pressure cooker.

U.S. Pat. No. 5,280,748 discloses apparatus for uniformly cooking packaged foods in a "cook/chill" tank in which hot water is circulated to cook the food, then cold water is circulated to provide rapid cooling.

U.S. Pat. No. 5,080,164 discloses a process and device for heat treatment in continuous flow of a product mixture containing solids in liquid (i.e., a slurry), using a combination of heat exchangers to heat and then cool the slurry.

U.S. Pat. No. 3,780,644 discloses a mobile milk processing system mounted upon a motor vehicle, providing for field pasteurization, homogenization and packaging of raw milk. Water is heated or cooled and circulated as a heating and cooling medium. This system is intended to overcome the disadvantages of central processing plants which process milk in continuous flow.

U.S. Pat. No. 5,209,157 discloses a plant for manufacturing dairy preparations based upon skim milk and vegetable oils. A heater provides for brief heating and cooling of the product prior to packaging.

U.S. Pat. No. 4,534,986 discloses a system for the indirect "ultra-high" heat treatment of liquids such as milk with minimal thermal damage.

U.S. Pat. No. 4,515,823 discloses a process and apparatus for separation of raw milk into cream and skim milk, the latter of which is pasteurized and cooled by regenerative heat exchange in heat exchangers.

U.S. Pat. No. 4,446,781 discloses a process and apparatus for mechanical/thermal treatment of fluids such as melted cocoa masses, which can include sterilization and pasteurization.

U.S. Pat. No. 5,360,055 discloses a method and apparatus for heat treating fluid products such as milk, including a counter current heat exchanger.

U.S. Pat. No. 5,443,857 discloses a method and apparatus for sterilizing milk based liquid products, including indirect preheating and final heating to sterilization temperature by direct steam injection, followed by flash-cooling.

U.S. Pat. No. 3,973,048 discloses a method and apparatus for sterilizing liquids by brief heating, involving compression and pressure reduction to transfer heat and attain sterilization temperatures.

U.S. Pat. No. 4,738,302 discloses apparatus for heat-treating liquid products including series-connected multi-tube heat exchangers for heating and cooling the products.

U.S. Pat. No. 4,432,276 discloses apparatus for heating, pasteurizing and sterilizing fluid foodstuffs in which the substance to be heated is brought in direct contact with a heating fluid.

U.S. Pat. No. 4,446,778 discloses a pasteurization system for dairy farming products, including several basins wherein the pasteurization cycle is effected in sequence, the heat taken from one basin during its cooling phase being used to heat at least one other basin. A refrigerating circuit, heat pump and heat exchanger are used to heat and cool the basins.

U.S. Pat. No. 4,310,476 discloses apparatus for treating fluids at sterilization temperatures in which the fluid is heated by direct contact with steam while it is in the form of a thin, free-falling film or stream.

Most of these patents disclose apparatus and methods for the continuous processing of milk or other foodstuffs, and most of these systems are complicated and expensive. There remains a need for a simple, economical portable apparatus for batch processing of milk on dairy farms and the like.

SUMMARY OF THE INVENTION

It is an object of the present invention to provide portable apparatus for the batch pasteurizing or heat treatment of liquid products in various locations, especially food products for consumption by animals or humans. Another object of the invention is to provide such portable apparatus which can be used with typical hot and cold tap water and electrical current available in dairy barns and the like. Another object is to provide for convenient field pasteurization of excess dairy products, which can then be fed to calves or other young livestock with reduced chances for the spread of disease. Still another object of the invention is to provide apparatus that can be quickly and effectively cleaned between uses to minimize health hazards. Yet another object of the invention is to provide portable apparatus of various sizes to meet the needs of diverse dairy sites. A further object is to fabricate portable apparatus from various commercially available components to provide units having varied sizes and capabilities. Still another object is to provide programmable time-temperature profiles to accommodate various processing needs. A further object is to provide a system which will allow about a sixty minute heating/cooling cycle for typical volumes of milk. A final object is to simplify the design and assembly of the apparatus so that the average dairyman can operate and service the unit with minimum downtime.

These and other objects and advantages are attained by apparatus of the present invention, comprising apparatus for the batch heating and cooling of fluids in bulk containers, comprising:

- at least one heating/cooling coil to be inserted into the fluid to be heated and cooled;
- at least one impeller to circulate the fluid to be cooled around the heating/cooling coil;
- connections for sources of pressurized heating and cooling fluids;
- temperature sensing means for measuring the temperature of the fluid to be heated and cooled;
- valve means and switching means for successively turning on and off the heating and cooling fluids;
- thermostat and control means for shifting from heating to cooling fluids in the coil when the treated fluid has been at the preset temperature for a sufficient time, and for turning off the cooling fluid to terminate a cycle when the treated fluid has attained the desired cooled temperature.

In preferred embodiments, the apparatus comprises a dome top fastened to the heating/cooling coil and the impeller shaft, the dome top being so dimensioned so that it can be fastened to the top of the container holding the fluid to be treated and thus protect the fluid from the atmosphere. Heating and cooling means can be provided to adjust the temperature of the heating and cooling fluids. Preferably, at least one pump is provided to direct the heating and cooling fluids through the coil. The heating and cooling fluids can either be returned to their sources for reuse or directed to drains. Means can be provided to conveniently hoist the apparatus out of the container of fluid treated, and to lower it in for a treatment cycle. Means are provided for efficient cleaning of the coil and other components between cycles.

Further in accordance with the invention, methods are provided for carrying out heat treatment processes such as pasteurization of dairy products using the apparatus of the invention, comprising steps of:

- inserting the heating/cooling coil into a container of fluid to be treated;
- attaching the dome top to the container to separate the fluid from the atmosphere;
- activating the impeller to circulate the fluid to be treated about the coil;
- directing heating fluid through the coil for a period effective to raise the fluid to be treated to a predetermined treatment temperature and hold it there for a predetermined time;
- shutting off the heating fluid and promptly directing cooling fluid through the coil to quickly reduce the temperature of the treated fluid to a stable lower temperature for use or storage;
- shutting off the cooling fluid to complete the cycle; and
- removing the apparatus from the container of treated fluid.

By "portable" it is meant that the apparatus can be moved from place to place with relative ease, using manpower or simple lifting/hauling devices, and can be employed wherever suitable sources of electrical power and heating/cooling fluids are available. Such apparatus can be used in various dairy barns or other facilities at a single site and moved from site to site as well. By "bulk" containers it is meant that the fluids to be treated are contained in open containers allowing access to the apparatus of the invention, in contrast to sealed containers such as tin cans.

BRIEF DESCRIPTION OF THE DRAWINGS

A more complete appreciation of the invention and many of the objects and advantages thereof will be readily obtained by perusing the following detailed description and appended claims in combination with the accompanying drawings, wherein:

DETAILED DESCRIPTION OF PREFERRED EMBODIMENTS

Although a preferred embodiment of the present invention has been designed for pasteurizing milk on dairy farms and the like, and the invention will be discussed in that context, systems within the scope of the invention can be used for processing or heat treating all sorts of fluid materials. The fluids will normally be liquids of low to moderate viscosity such as milk, but can also be more viscous dairy products such as ice cream mix or cheeses. Naturally, the characteristics of the material to be treated must be studied and understood before effective heat treatment can begin. For example, it is necessary for each product to determine the appropriate temperature-time relationships for optimum treatment. It is well known that the pasteurization or sterilization of milk and milk products involves a delicate balance between providing enough heat (through specified combinations of time and temperature) to kill target microbes without adverse effects on the flavor and other characteristics of the product. Different products, and even milk from various species such as goats, will require different temperature-time profiles for optimum treatment. Generally, the best results with milk products are obtained by brief heating at relatively high temperatures, followed by prompt and fast cooling. The apparatus of the present invention can be adjusted and programmed to provide heat treatments, including cooking, pasteurization or sterilization treatments, for a variety of milks and milk products (e.g., cream, reconstituted milk, ice cream mixes, puddings, candies and condensed or evaporated milk), fruit juices, ciders, fermented beverages such as beer and wine, yeast and meat extracts, slurried materials such as soups and stews, vegetable oils and chemical preparations. Thus, while a preferred embodiment will be disclosed for the pasteurization of cow's milk, the broad capabilities of the apparatus and methods disclosed should be kept in mind.

Figure 1:
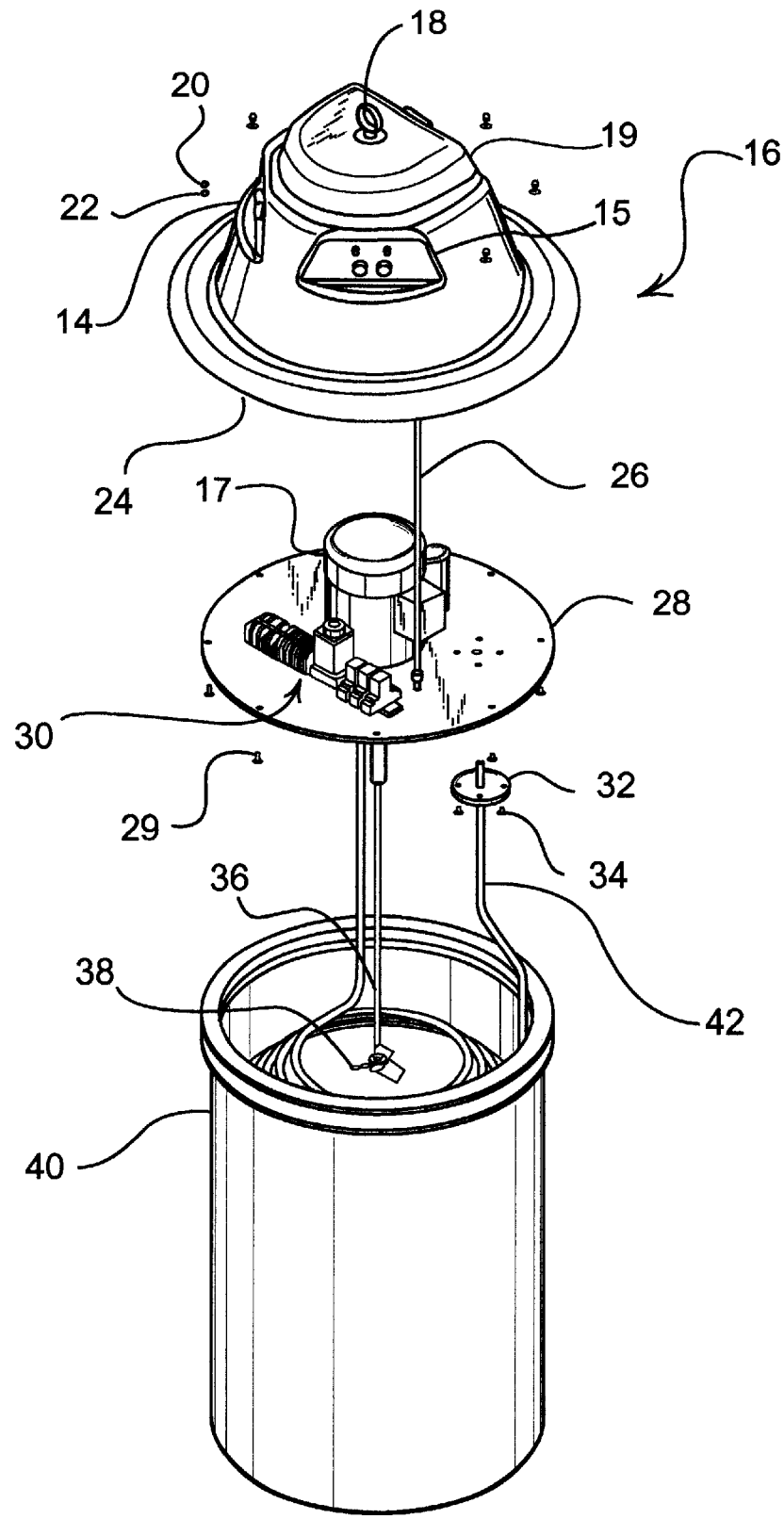
FIG. 1 is an exploded perspective view of the apparatus of the invention and a fluid container.

Turning now to the drawings, FIG. 1 illustrates a batch pasteurizer 16 of the invention partially inserted into a container 40 which holds a fluid to be heat treated (not shown). In the dairy context, container 40 can be a 55 or 20 gallon drum; the pasteurizer 16 can be sized or adapted to fit various types and sizes of containers which may be encountered in the field, with volumes ranging from about 10 to 250 gallons. Such containers can be any standard product designed for dairy farm use, but are preferably made of stainless steel or durable plastics such as fiberglass, polypropylene, polyethylene, nylon or polytetrafluoroethylene (Teflon™), which are light and can be cleaned effectively. The containers preferably include a spigot or other liquid transfer means near the bottom to facilitate transfer of the treated liquid into buckets or other secondary containers. Hoisting ring 18 (an eye bolt) provides a connection for lifting and transporting the apparatus to a position where it can be lowered into an open container for use. Such a unit is portable in that it can be used at various stations within a dairy barn or other site, or moved from site to site. A typical dairy unit should weight about fifty pounds, but the weight will vary according to size and materials.

Figure 1A:
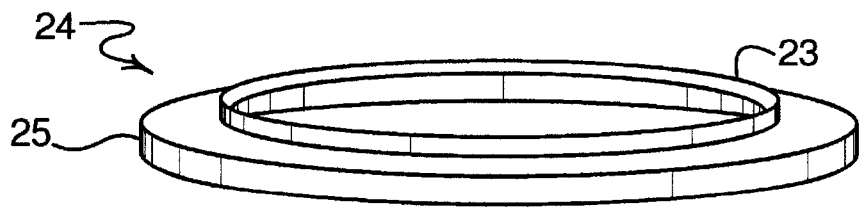
FIG. 1A is a side perspective view of an adaptive collar for the apparatus.

Dome top 19 is fabricated to contain connections for heating and cooling fluids (discussed below), a motor-driven impeller and control systems and to position the heating/cooling coil and the impeller on its shaft. The dome top 19 is dimensioned to fit the top of container 40 and separate the contents from the atmosphere, with the help of adapting collar 24 with rolled edge 25. FIG. 1A illustrates a collar 24 with conforming edge 25 and a riser lip 23 to receive the pasteurizer unit. The collars can be produced in sizes to accommodate any combination of containers and pasteurizer units, using stainless steel. Although gravity alone produces a good seal, optionally a gasket of suitable elastomeric or resilient material (not shown) can be used between the collar and container. Dome top 19 is fabricated of fiberglass or durable plastics as described above for the container, so as to withstand constant scrubbing.

Impeller 38 is attached to shaft 36, which is driven by driving means 17, conventionally an electrical motor. Various types of propellers having at least two blades and other types of impellers can be used, provided they produce the desired thorough circulation of the treated fluid. Although the impeller is normally rotated to drive the fluid upward past the heating/cooling coil, the motor can be reversed. Multiple impellers and/or shafts can be used if required by the configuration of the product container. The motor should be an industrial grade electrical motor which is suitable for damp environments. Motor 17 is supported by chassis plate 28, which is sealingly secured into dome top 19 in a watertight manner by screws 29, washers 22 and nuts 20, or other suitable fasteners. Chassis plate 28 can be fabricated of aluminum or suitable plastics. Control system 30, also secured to chassis plate 28, is discussed below. Water inlets 14 and outlets 15 are also discussed below. Thermocouple 26 preferably reaches to approximately the lower third of the fluid in the container when the unit is assembled, and senses the temperature of the circulating fluid when the system is operating. The positions of the coil, impeller and thermocouple permit operating with a partially full container of product. Coil mounts 32 and screws 34 are used to fasten the two ends of heat exchange coil 42 to chassis plate 28. The ends of coil 42 provide male attachment sites for tubing to be clamped inside dome top 19. The components attached to the dome top and chassis plate, including coil 42, shaft 36 and thermocouple 26, are attached securely and braced with suitable brackets or shields (not shown) to prevent damage while the unit is being handled.

Figure 2:
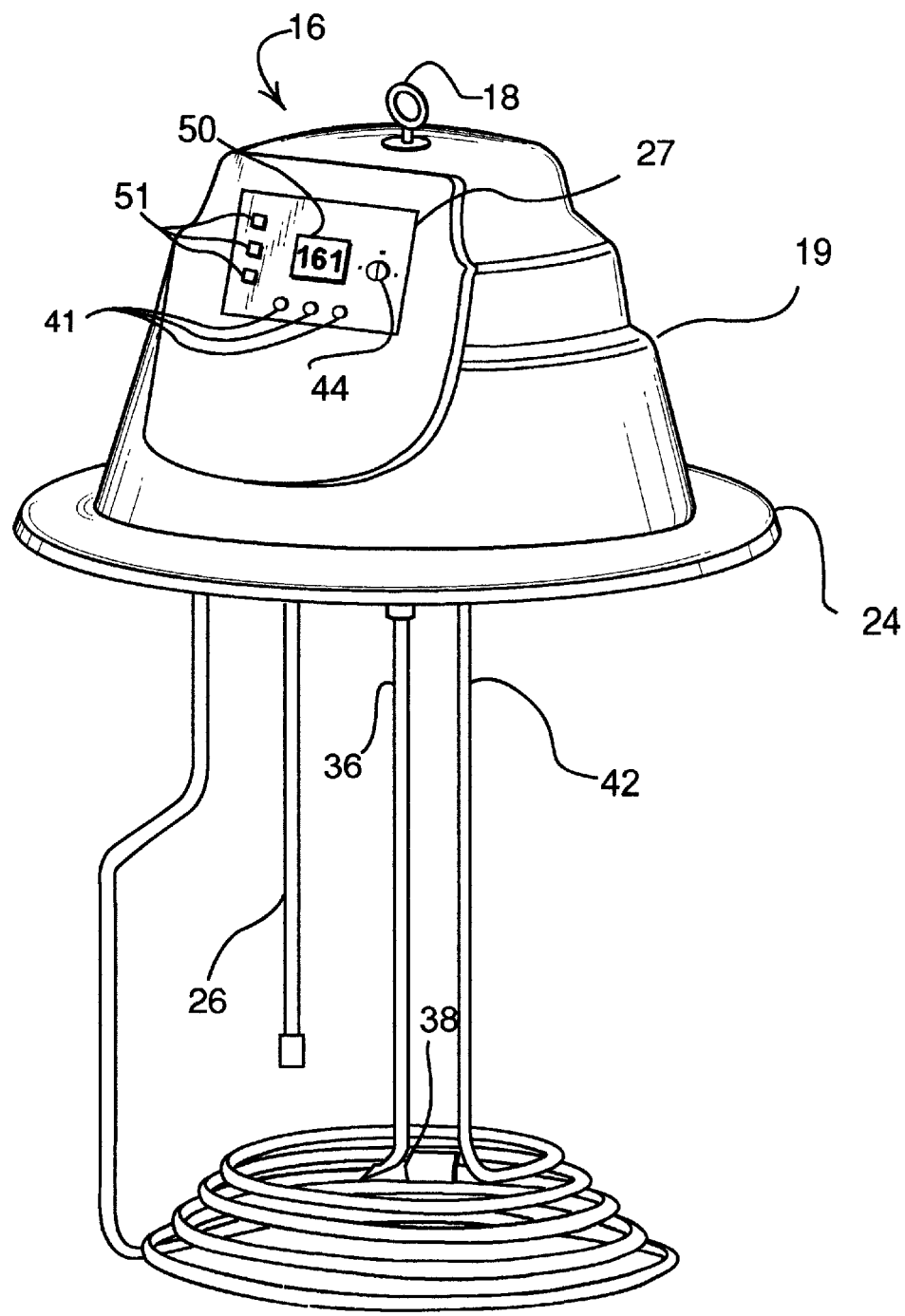
FIG. 2 is a perspective view of the apparatus alone.

Heating/cooling coil 42, more easily seen in FIG. 2, extends downward from the dome top via inlet and outlet sections to concentrate the main heat exchange sections near the bottom of the container of fluid to be treated. The lower section of the coil has a helical conical form; that is, as shown in the figures, it describes circles of decreasing diameter from bottom to top, starting with a diameter which is nearly that of the container itself. While any suitable configuration can be used for the coil which optimizes heat transfer between the fluids inside and the fluid to be treated, this helical conical form is considered effective because the impeller drives the fluid to be treated from the bottom of the container past many sections of the coil, whence it circulates throughout the container to achieve rapid and uniform temperature change for the treated fluid. This configuration maximizes surface area exposure of the tubing for heat transfer and cleaning purposes. The impeller illustrated an rotate at about 45 to 60 RPM. Multiple coils can be used in certain configurations of the apparatus, at the expense of greater complexity For example, a faster transition between heating and cooling phases can be made if separate coils are used for heating and cooling fluids, with cooling fluid turned on as heating fluid is shut off.

Figure 3:
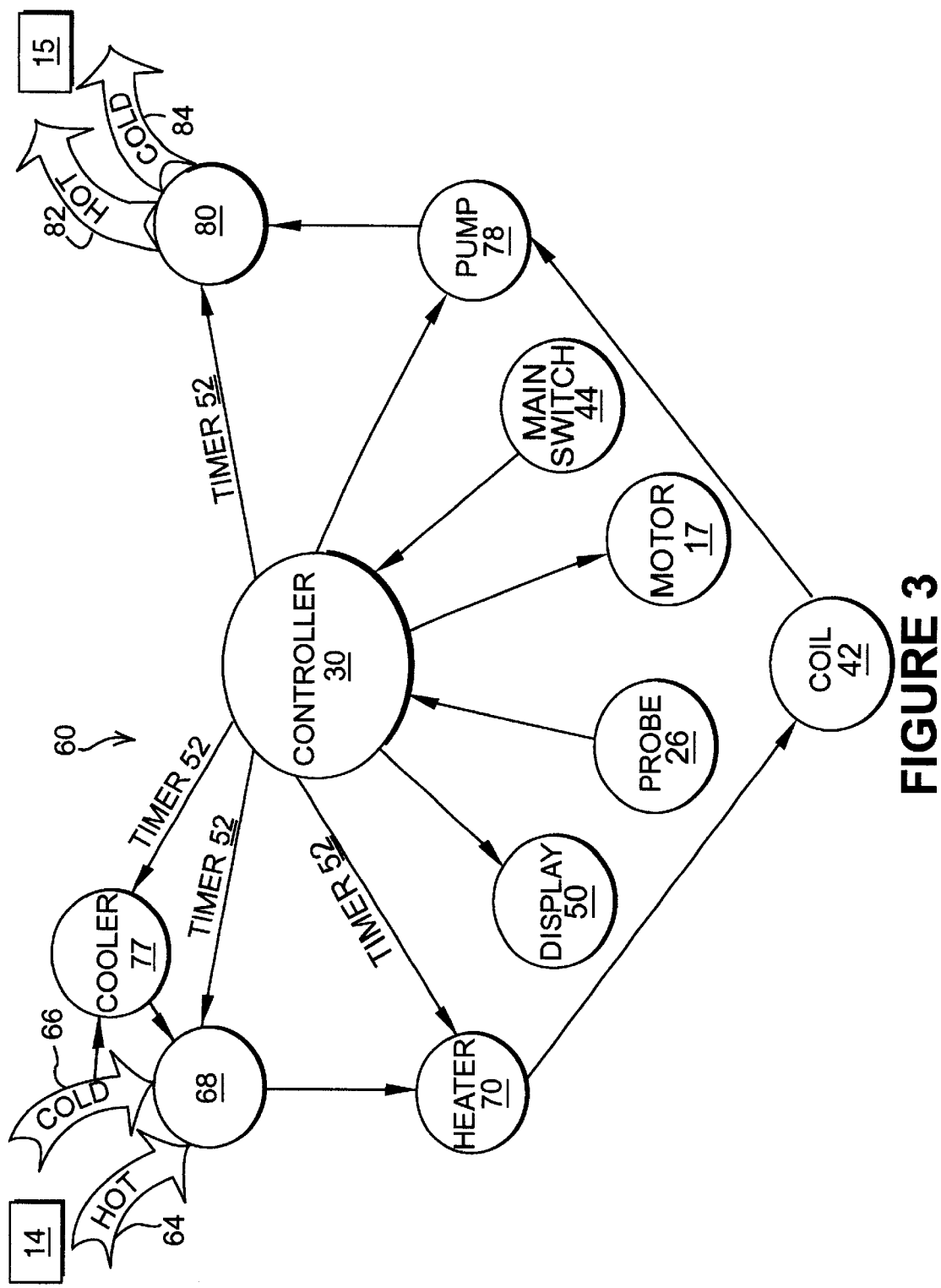
FIG. 3 is a schematic diagram of a control system for the apparatus.

FIG. 3 is a schematic diagram of a control system for the operation of the apparatus and method of an embodiment of the invention. It must be emphasized that a variety of control systems assembled from commercially available controllers, switches, valves and the like can be used for this purpose. The controller uses an off-on-start type switch similar to the ignition switch in a car. The controller monitors and displays the temperature of the circulating liquid and turns the various devices on and off as required. The controller illustrated is microprocessor-based, but analog controllers can also be used. In the most basic version, or perhaps an alternative version, the apparatus can be manually controlled, provided that a thermometer or other appropriate temperature sensor is available. Preferably, the controller comprises a programmable logic controller (PLC), which would allow many other desirable programming options including data logging and interfacing with personal computers Suitable controllers should have thermocouple inputs, plus at least two event-driven contacts which can be set or programmed to energize or deenergize based upon current temperature conditions. Suitable controller components are commercially available from the Barber-Colman Co. of Loves Park, Ill., Honeywell and other sources.

As shown in FIG. 3, control system 60 comprises a controller 30 which communicates with solenoid inlet valves relay 68, heater 70, display 50, thermocouple probe 26, motor 17, main switch 44, circulating pump 78, optional cooler 77 and solenoid outlet valves relay 80. In operating the system, after placing the dome top on the container (preferably securing same in place) and connecting water hoses and power, main switch 44 is turned on and hot water solenoid inlet valve 57 is opened to allow entry of hot water from source 64. Heater 70 is normally turned on to heat the hot water to the proper pasteurizing or sterilizing temperature. Heater 70 should be adequate to produce water at pasteurizing or sterilizing temperatures from sources such as ordinary hot water heaters which may be used in dairy barns. Such hot water heaters produce water in the 175 to 200 deg. F. range. If such hot running water is not available, additional or more powerful inline heaters can be used. Alternatively, if a source of steam is available, steam may be injected into the hot water intake system to heat the water, as disclosed in U.S. Pat. No. 3,780,644, which is incorporated herein by reference.

Motor 17 is started to rotate the impeller 38 and circulate the fluid to be pasteurized, and pump 78 removes the hot water after it has circulated through coil 42. Such a pump is preferably used to circulate water within the apparatus, and larger or additional pumps could be installed if normal water pressure is unavailable. However, with water pressure at least that of normal household water systems, it is possible to operate such a system on water pressure alone. Hot water flow continues until the temperature in the circulating fluid under treatment reaches the predetermined temperature (e.g., 161 deg. F. for bovine milk to be pasteurized) and a timer 52 is started to maintain the temperature for a predetermined time (e.g., 30 minutes for normal milk pasteurization at 145 deg. F., or 15 seconds at 161 F.). At this point, heater 70 is shut off, and after the elapsed time hot water solenoid valve 68 is closed.

Cold water solenoid valve 68 is then promptly opened, and a flow of cold water maintained until the temperature of the circulating fluid is reduced to the proper level for immediate use (i.e., about 100 deg. F.) or storage (about 38 deg. F.). Naturally, the colder the water the faster the treated liquid can be cooled and the longer the product will last without spoiling. Normal cold tap water is sufficient at moderate ambient temperatures, but for faster cooling and/or chilling to storage temperatures, chilling or refrigeration systems can be used in the cold water intake system, represented by cooler 77 in FIG. 3. Such systems can be as simple as a chamber containing ice over which the intake water flows, or can incorporate conventional inline refrigeration systems such as used to produce chilled drinking water. U.S. Pat. No. 3,780,644 discloses such systems in columns 4 and 7. Once the liquid is cooled to the desired temperature, all solenoid valves are closed, pump 78 and motor 17 are shut off, and the pasteurized milk (or other heat-treated fluid) can be drawn for use such as feeding calves.

As suggested above, such control systems can be assembled and set up for operation on a manual basis, but are preferably capable of fully automatic operation and are programmed to execute the complete cycle as outlined above with a simple actuation by the operator. The objective is to permit the pasteurization or other heat treatment to proceed with a minimum of attention from the operator. Display panel 27 provides visual signals (using LED light-emitting diodes or the like) while the system is operating, identifying the heating and cooling stages, and preferably includes audible signals as well. The operator may be busy with other tasks, but will want to utilize the product promptly when the cycle is complete, and perhaps initiate another cycle with a fresh container of product.

Figure 4:
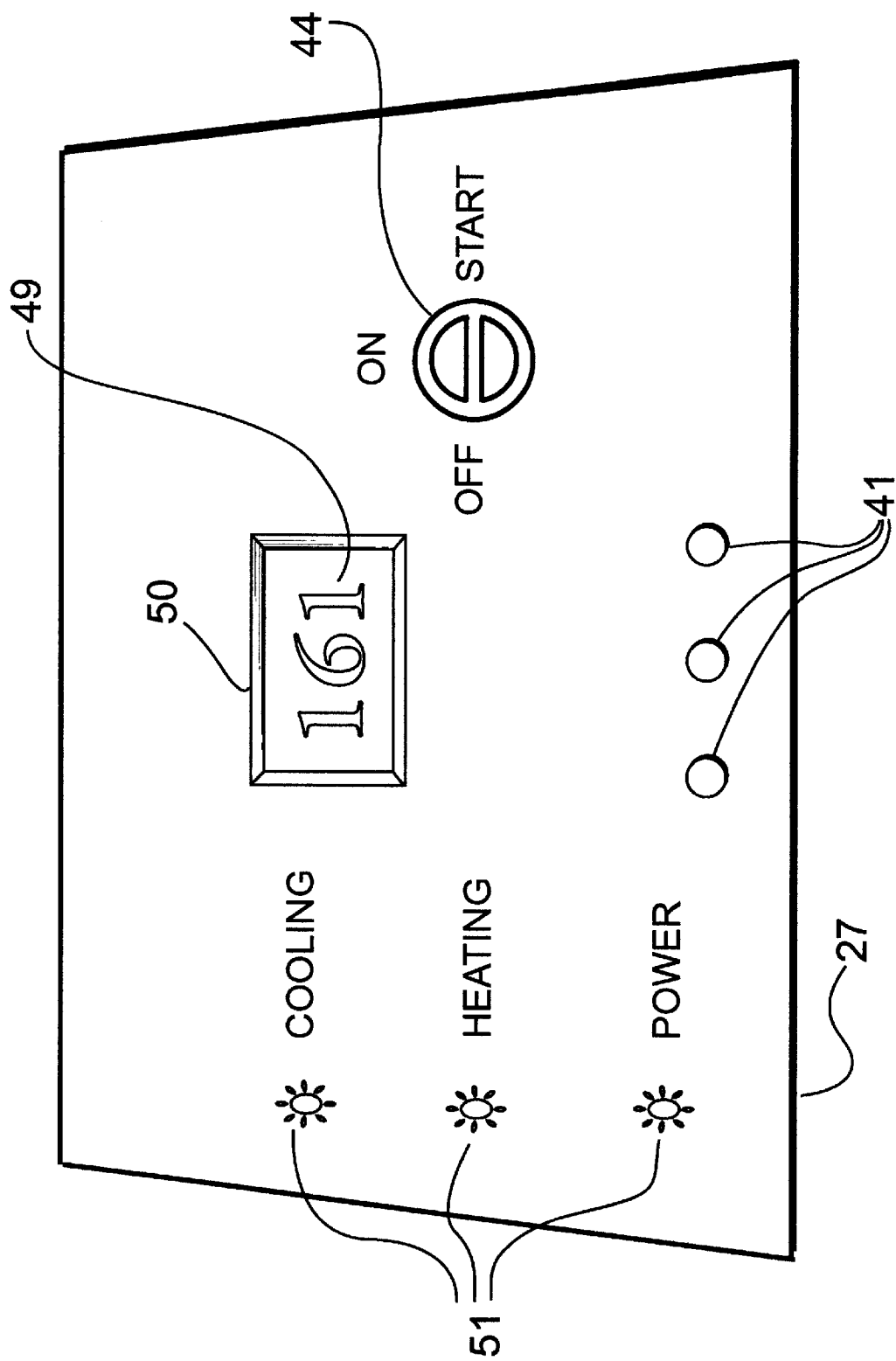
FIG. 4 is a detailed view of the switch/indicator panel.

FIG. 4 illustrates a typical switch/display panel 27 for the apparatus. Switch 44 is similar to an automotive ignition switch in that it has three positions—power off, power on, and "start," to initiate a programmed heat treatment cycle. For more basic models or an alternative to the programmed cycle, switching can be provided to initiate the heating and cooling cycles separately (not shown). Digital display 49 displays the temperature measured by thermocouple 26 in the circulating liquid. Signal lights 51 light up for power on and the heating or cooling cycles, as discussed below. At least two buttons 41 are provided for programming heating and cooling temperatures and other functions used in setting up the apparatus for standard cycles.

Figure 5:
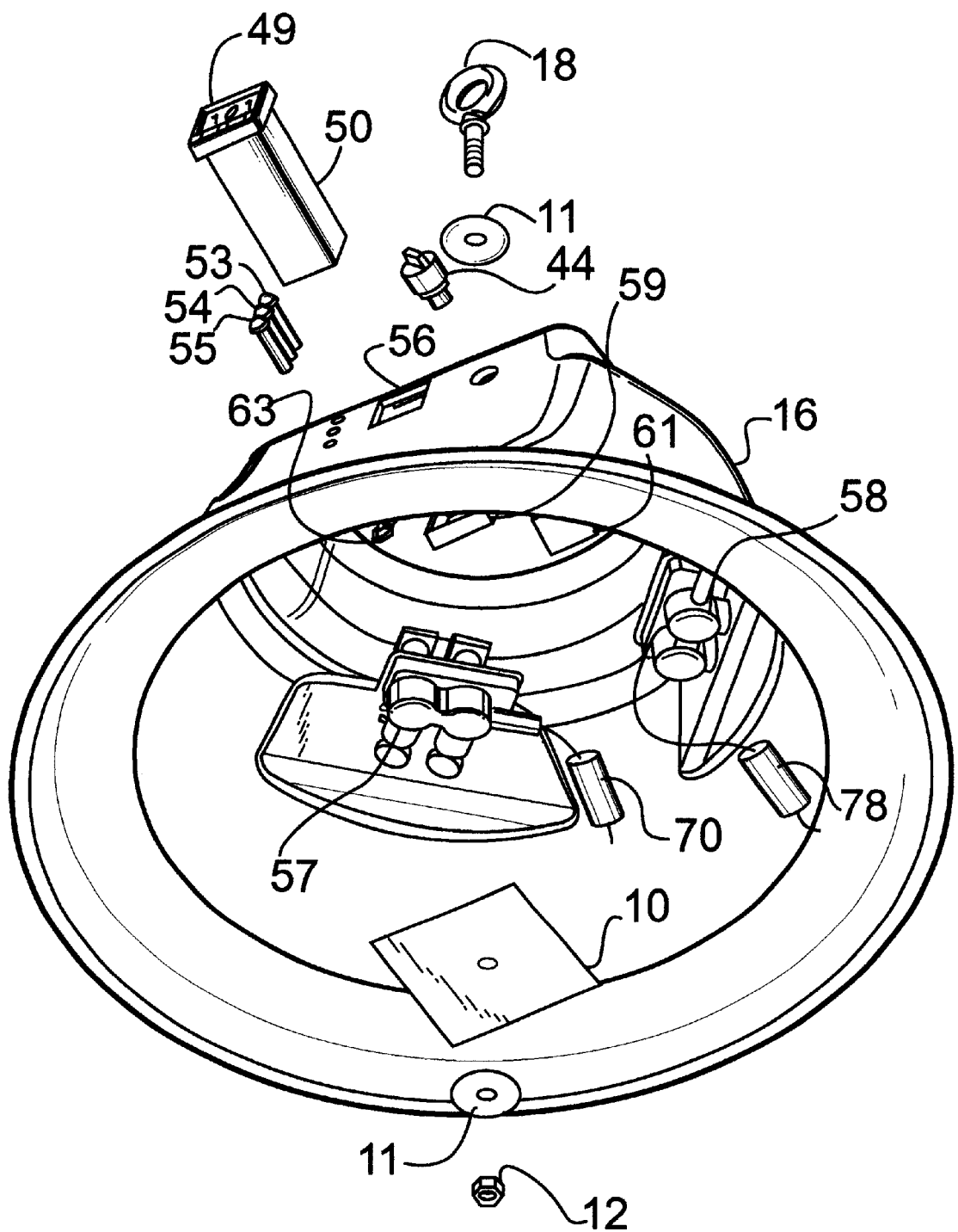
FIG. 5 is a perspective view of the underside of the dome top of the apparatus.
Figure 6:
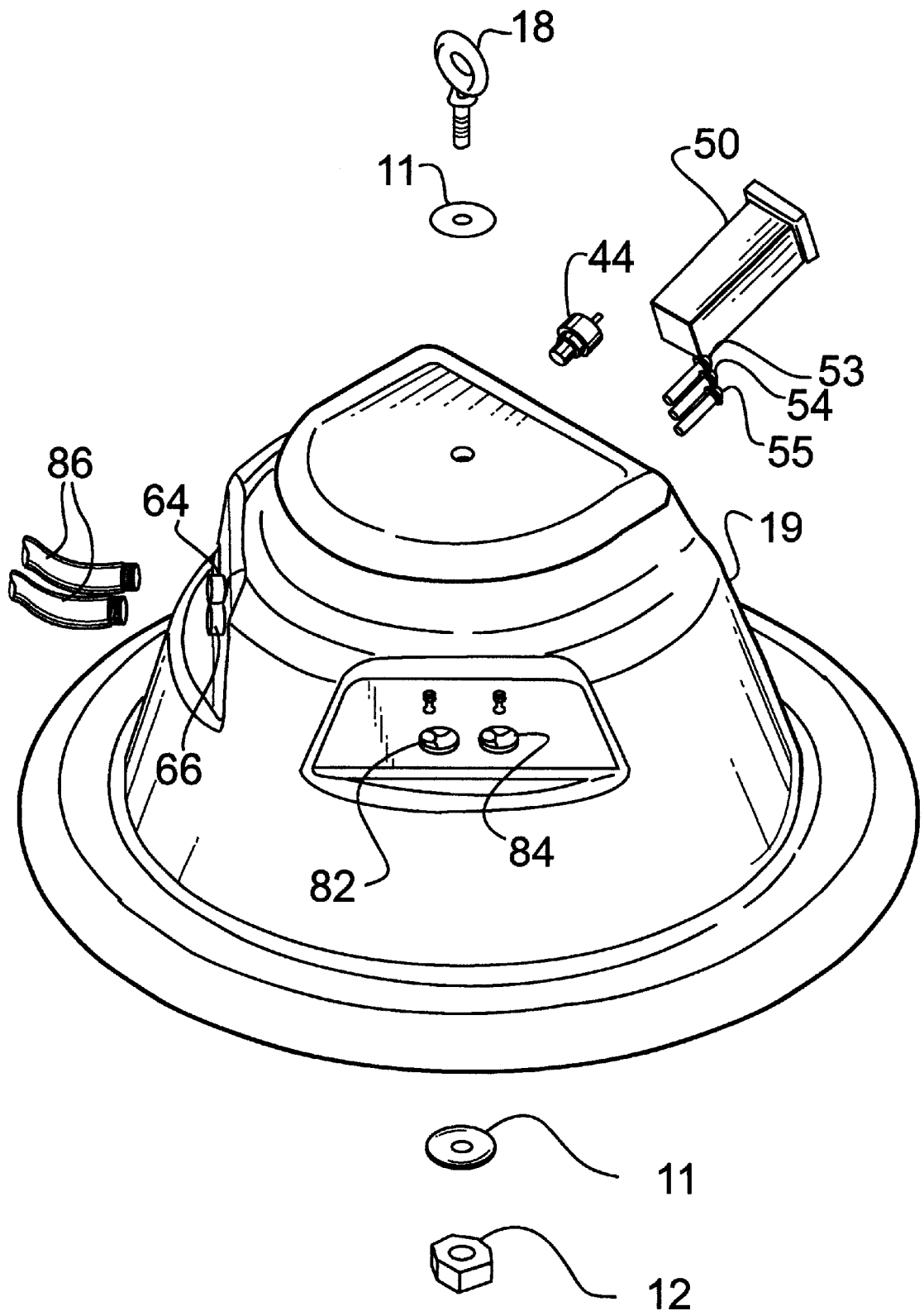
FIG. 6 is a rear perspective view of the dome top showing hose connections.
Figure 7:
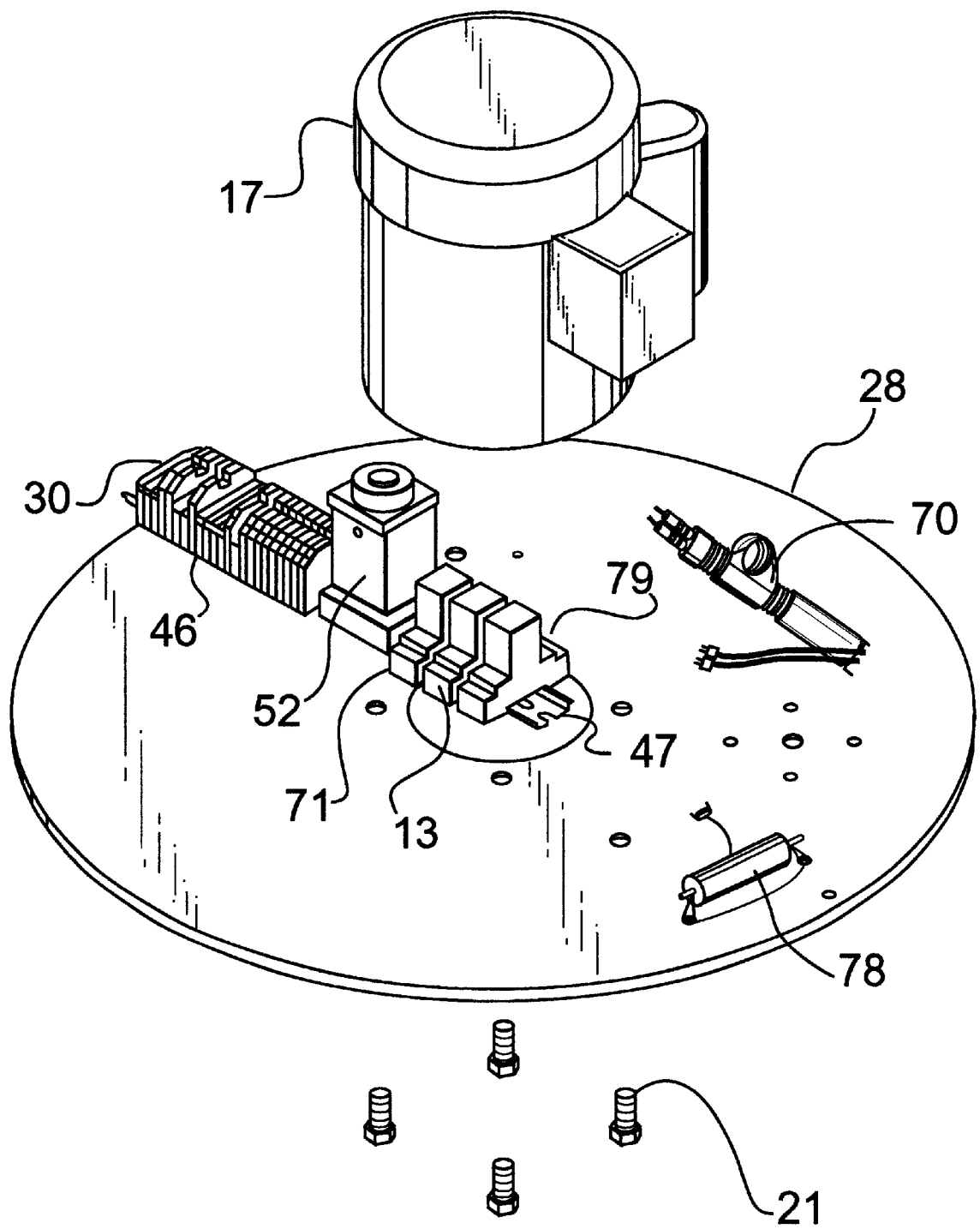
FIG. 7 is a top perspective view of the chassis plate showing the impeller motor and electrical connections.
Figure 9:
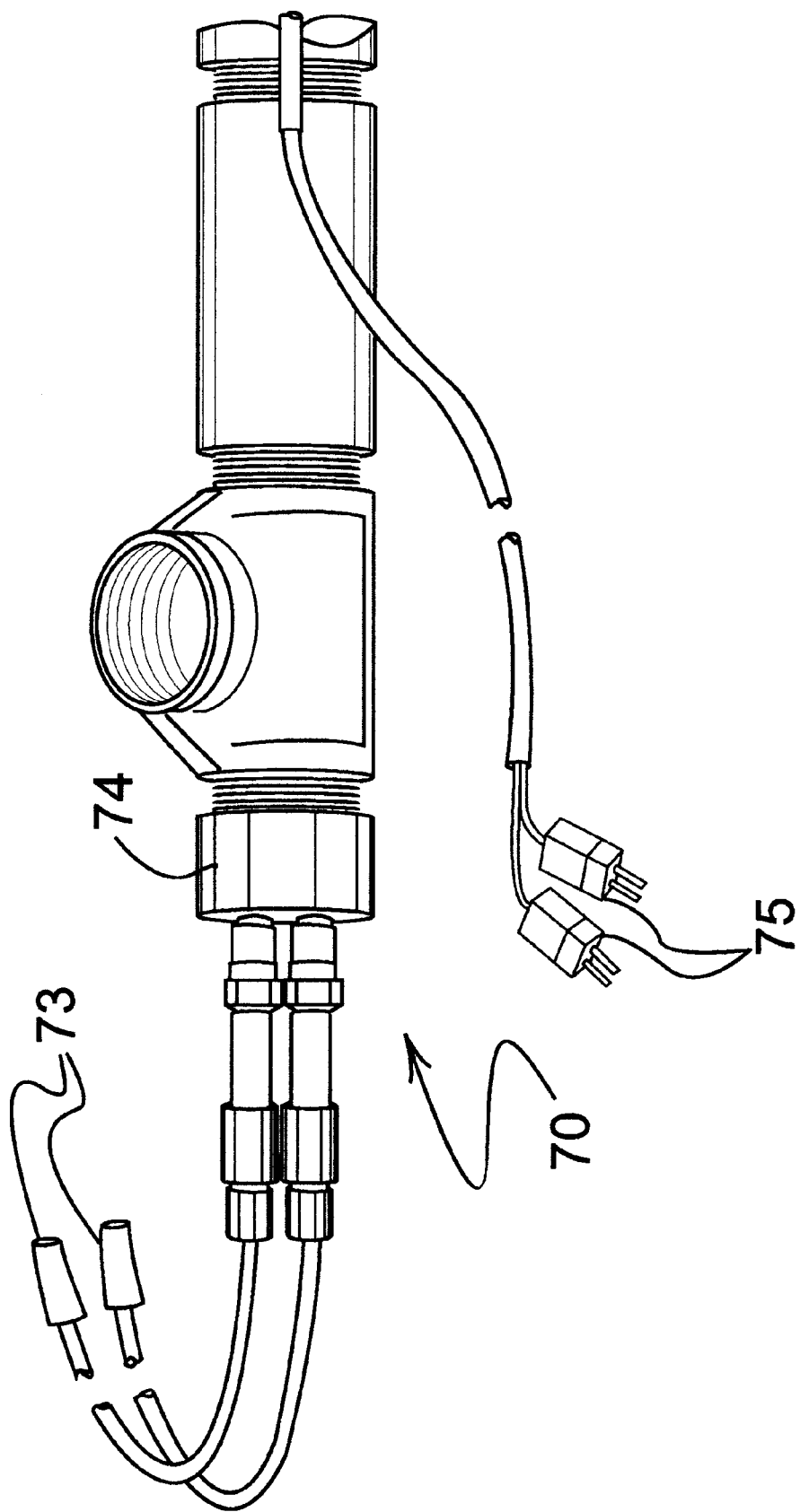
FIG. 9 is a perspective view of typical inline heater.

FIG. 5 illustrates the underside of the dome top 19 with the chassis plate removed. Lifting eye 18 is attached by nut 12, load support 10 and washers 11. Thermometer module 50 is connected to thermocouple 26 (not shown here) and registers the temperature of the treated fluid on digital display 49. The thermometer module 50 fits into recess 56 in the dome top. Signal lights 53, 54 and 55 are red, amber and yellow respectively, and light up to signal the heating, cooling and power stages of the heating/cooling cycle. These lights can be any suitable type, but are preferably light-emitting diodes (LEDs). Preferably, the light signals also actuate an audible signal (not shown here) to alert the operator to the progress of the cycle. Fastener/sealer 59 secures the back of thermostat 50, and switch box 61 is attached to switch 44. Fasteners/connections 63 provide power to signal lights 53, 54 and 55. Double electric solenoid valves 57 and 58 control the inlet and outlet of hot and cold water, and are actuated as described above in the control system, using simple on-off control. The valves are connected to hose fittings (not shown here) on the outside of the dome top, to which ordinary utility hoses can be attached to connect the apparatus to sources of heating and cooling water as shown in FIG. 6. Hoses 86 connect to the inlet and outlet fittings. An electrical in-line heater 70 is provided within the hot water circuit to bring the heating water to the proper predetermined temperature for the cycle. The heater is actuated as discussed above. Heater 70 and circulating pump 78 can be mounted on chassis plate 28, as shown in FIG. 7. FIG. 9 provides a detailed view of a typical inline heater, which is commercially available from Infinity Fluids. As shown, leads 73 provide power to heating element 74, in response to signals from leads 75. Other suitable heaters are available commercially from Electro-Pak, Inc. of Reading, Pa. Various types of commercially available gas-powered inline heaters can also be used.

FIG. 6, a perspective view of the dome top 19 from another side, reveals hose connections 64 and 66 for hot and cold water inlets, respectively, as well as hot and cold outlets 82 and 84. Hoses 86 are attached to both inlets and outlets (not shown here).

Figure 8:
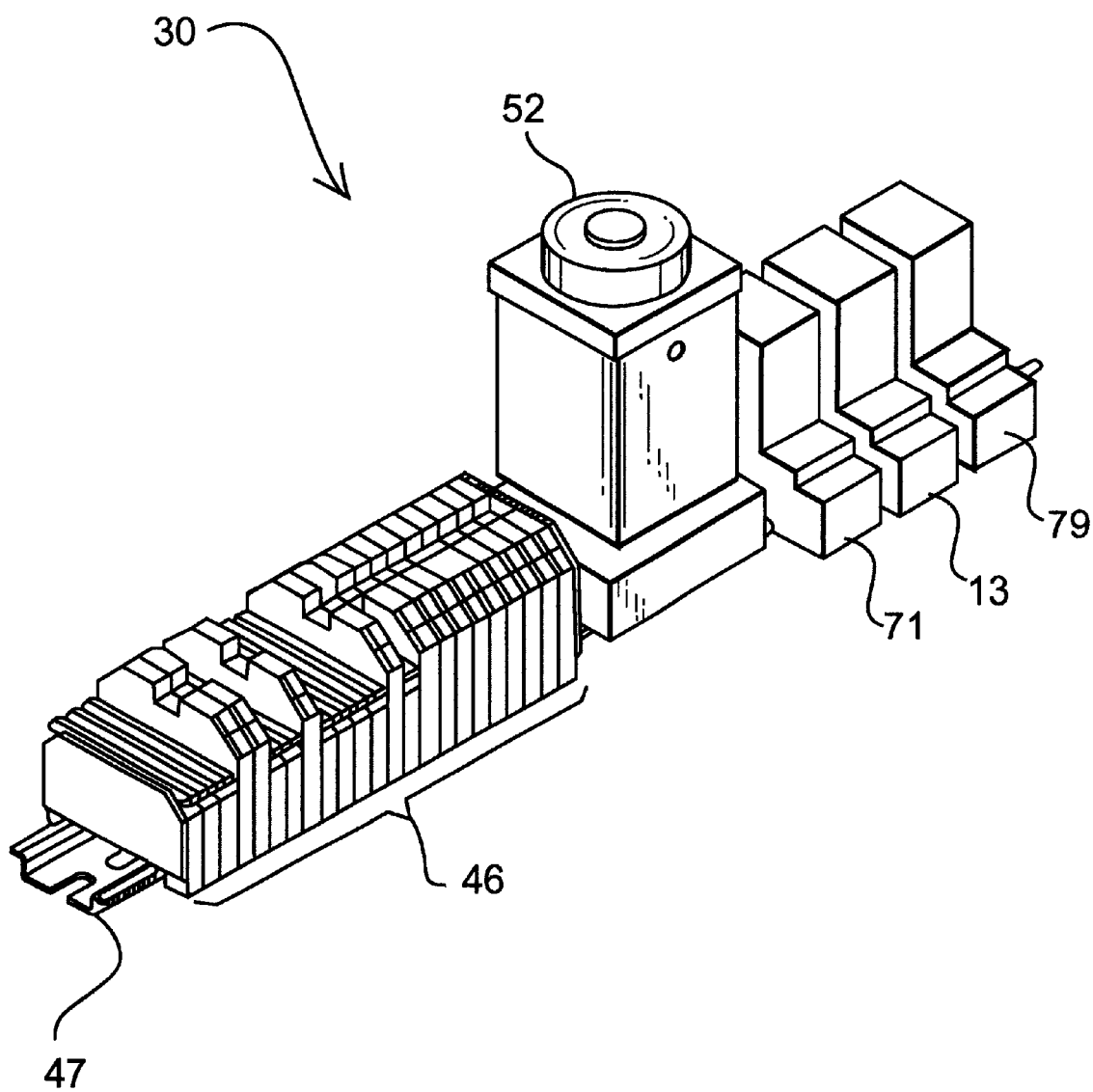
FIG. 8 is a detailed perspective view of the controller components mounted on the chassis plate.

FIG. 7 illustrates the mounting of the controller components 46, 52, 71, 13, 71, 79 and 47, plus inline heater 70 and circulating pump 78 on chassis plate 28, from which motor 17 has been detached. Motor 17 is normally held in place by motor mount bolts 21. FIG. 8 illustrates these components in detail. Components of controller 30 include multiple relay switches 46, timer 52 and separate relay switches for the heater (71), motor (13) and pump (79), all mounted on a standard DIN mounting strip 47. All these components are electrically interconnected to function with the control system 60 described above and in FIG. 3. Inline heater 70 and pump 78 are mechanically fixed to chassis plate 28 by conventional fasteners (not shown), and electrically connected and plumbed as described above.

Figure 10:
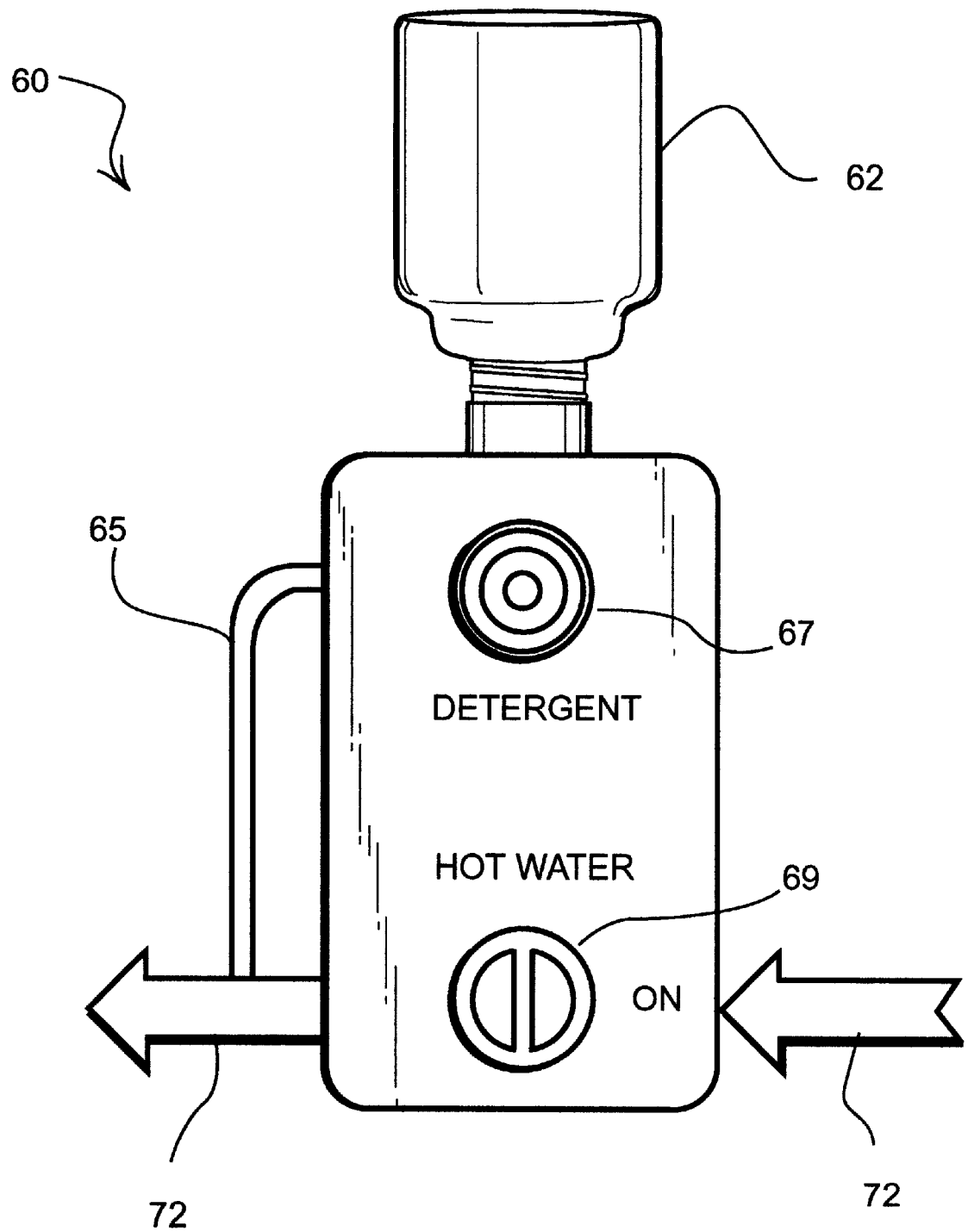
FIG. 10 is a side view of a cleaning system for the apparatus.

FIG. 10 illustrates a detergent dispenser 60 for cleanup of the apparatus between cycles. Once the apparatus has finished a pasteurizing cycle, it is raised from the pasteurizing container 40 and returned to a suitable cleaning/storage drum (not shown) where cleaning takes place. The detergent dispenser 60 is plumbed into hot water line 72 so that detergent can be injected into the line. In use, the operator pushes button 67 to dispense a predetermined amount of detergent into vacuum straw 65. Detergent bottle 62 is removably attached to the top of the dispenser and releases detergent through a valve (not shown) actuated by button 67. The operator then turns spring timer valve 69 to the "on" position to initiate hot water flow for a set period of time, and hot water with detergent flows into the high pressure cleaning nozzles (not shown), which are mounted on or near the bottom of the cleaning/storage container. The timer is normally set for about ten minutes, five minutes of which the water will carry detergent, followed by a five minute rinse. The nozzle in the bottom of the cleaning/storage container can be a clean-in-place tank nozzle such as the ScrubMate™ by BETE, other clean-in-place sprayers such as those used in dairy bulk tanks, plastic high pressure spray nozzles strategically placed in the drum, or rotating spray arms such as those used in dishwasher manufacture. When the cleaning cycle is complete, the apparatus is allowed to drain and stay stored in the cleaning drum until its next use in pasteurization. The cleaning/storage drum includes at least one drain port in the bottom of the drum to allow cleaning water to escape to floor drains.

Figure 11:
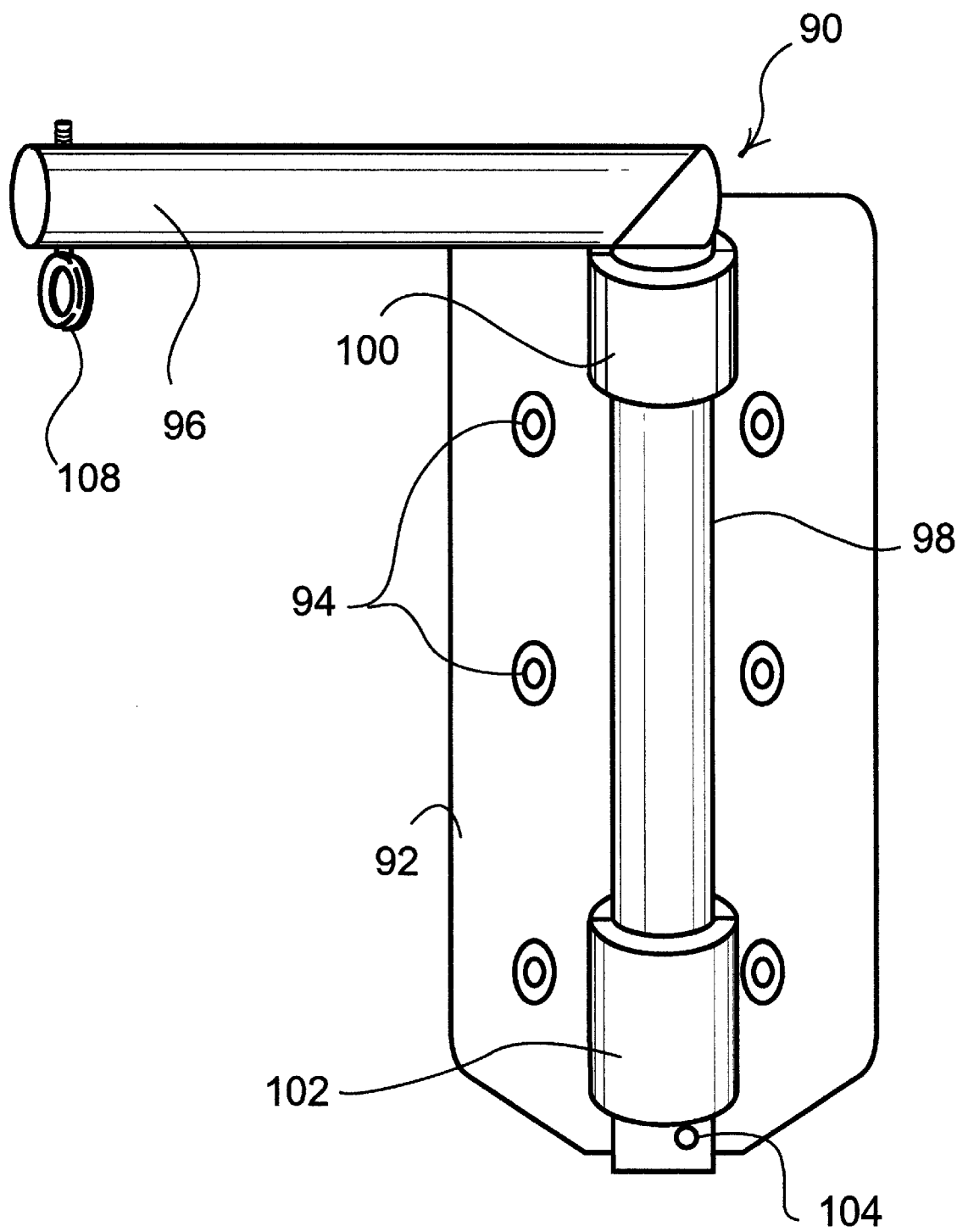
FIG. 11 is a side view of a wall bracket and support system permitting the apparatus to be transferred from one container to another alongside.

FIG. 11 illustrates a simple wall mounting bracket assembly 90, fabricated from a single plate of sheet metal 92, which allows the apparatus to be elevated and swung from one drum to another, provided they are located side by side. Wall bracket 92 is fastened to the wall securely with bolts or screws (not shown) through holes 94. A one-piece solid shaft is bent at a right angle to form vertical (98) and horizontal (96) sections, and the vertical section hinges within simple tube hinges 100 and 102. The unit is secured in place with cotter pin 104 or the like. The horizontal portion 96 of the shaft can then be fastened to the lifting eye 18 of the apparatus via eye bolt 108 and conventional hoisting apparatus (not shown). Once the apparatus is elevated and thus attached, it can be swung clear of the first container and placed over another alongside.

EXAMPLE

The operation and value of the apparatus and methods of the invention will be further illustrated by the following non-limiting example. A prototype pasteurizer of the invention was used in a dairy operation for about six months to pasteurize waste milk for consumption by a group of Holstein and Jersey calves. An average of about 45 calves were being fed the product at any given time over this period. Health problems in the calves, along with labor and medical expenses, were significantly reduced (by about 90 percent overall) during this period. New cases of scours (diarrhea) and related illnesses such as joint ill, septicemia, pneumonia, etc. were reduced about 90 percent, with concurrent reductions in labor and medical costs. Significant increases were noted in weight gain, and immediate savings were realized by the elimination of the need to supplement the calves' feed with expensive milk replacer. It is anticipated that even greater improvements will be seen over the next two years as the results of the decrease in pathogens spread will become apparent when these calves grow into replacement cows and come into milk. The operators of the herd are very pleased with the initial results.

Clearly, numerous modifications and variations of the present invention are possible in light of the above teachings. It is therefore to be understood that within the scope of the appended claims the invention may be practiced otherwise than as specifically described herein.

I claim:

1. Portable apparatus for batch heating and cooling of fluids in bulk containers, comprising:
    at least one heating/cooling coil to be inserted in the fluid to be heated and cooled;
    at least one impeller to circulate the fluid to be cooled around said heating/cooling coil;
    connections for sources of pressurized heating and cooling fluids;
    means for sensing the temperature of the fluid to be heated and cooled;
    valve means and switching means for successively turning on and off the heating and cooling fluids;
    thermostat and control means for shifting from heating to cooling fluids when the treated fluid has been at the desired temperature for sufficient time, and for turning off the cooling fluid to terminate a cycle when the treated fluid has attained the desired cooled temperature.

2. The apparatus of claim 1 which further comprises a dome top fastened to said heating/cooling coil and said impeller, which top can be attached to the top of a container of fluid to be treated to separate said fluid from the atmosphere.

3. The apparatus of claim 1 wherein said heating/cooling coil comprises stainless steel.

4. The apparatus of claim 1 wherein said heating/cooling coil has a helical conical form, with the narrow portion topmost.

5. The apparatus of claim 1 wherein said impeller is a reversible motor-driven propeller located near the center of the lower portion of said heating/cooling coil.

6. The apparatus of claim 1 which further comprises control means which can be preset to heat and cool the treated fluid to preset temperatures and to maintain said temperatures for preset periods of time.

7. The apparatus of claim 6 wherein said control means can be preset to heat the treated fluid to a pasteurization temperature, hold said temperature for a pasteurization period of time and to cool said fluid to a stable preset cooled temperature.

8. The apparatus of claim 1 which is adapted to use conventional hot and cold tap water for the heating and cooling fluids, respectively.

9. The apparatus of claim 1 which further comprises a heat source and heating means to heat the available heating fluid to a desired temperature.

10. The apparatus of claim 9 which comprises an electrical heater to heat said heating fluid.

11. The apparatus of claim 1 which further comprises refrigerating means to chill said cooling fluid.

12. The apparatus of claim 11 wherein said refrigerating means comprise mechanical refrigeration.

13. The apparatus of claim 11 wherein said refrigerating means employ ice.

14. The apparatus of claim 2 wherein said dome top is attached to the top of said container by an adapting collar.

15. The apparatus of claim 6 wherein said control means are controlled by a switch which initiates a programmed treatment cycle.

16. The apparatus of claim 6 wherein said control means comprise signal means to identify the beginning, stage and completion of the treatment process.

17. The apparatus of claim 16 wherein said signal means provide at least one of visual and audible signals.

18. A process of thermal treatment of a fluid in a bulk container with the apparatus of claim 1, comprising steps of:

- inserting the heating/cooling coil into said fluid;
- activating said impeller to circulate the fluid in said container around said coil;
- causing heating and cooling fluids to flow through said coil for periods effective to heat and cool the treated fluid to the desired temperatures and maintain same for the desired time periods; and
- removing said apparatus from said container of treated fluid.

19. A portable batch pasteurizer for dairy products, comprising:
   - a dome top which is dimensioned and equipped with sealing means to be sealingly attached to the top of a standard container for dairy products;
   - attached to said dome top, a heating/cooling coil having a helical conical form and extending to near the bottom of the container when the dome top is installed;
   - also attached to said dome top, an electrical shaft-driven impeller located inside the lower portion of said coil which circulates the liquid when activated;
   - means for connecting said heating/cooling coil to sources of pressurized hot and cold water;
   - heating means for heating incoming hot water to a predetermined temperature before it enters said coil;
   - temperature sensing means for measuring the temperature of the liquid product during the heating and cooling processes;
   - switching and valve means for controlling the flow of hot and cold water to said coil; and
   - control means for executing a cycle of directing hot water through said coil for a time effective to bring the liquid product to a pasteurization temperature and hold it at said temperature to complete pasteurization, thereafter shutting off the hot water and directing cold water through said coil for a period of time effective to cool the liquid product to a stable lower temperature for use or storage.

20. The pasteurizer of claim 19 which further comprises means to cool said cold water prior to entry into said heating/cooling coil.

* * * * *